United States Patent [19]

Mimura et al.

[11] Patent Number: 5,750,083

[45] Date of Patent: May 12, 1998

[54] METHOD FOR THE REMOVAL OF HYDROGEN SULFIDE PRESENT IN GASES

[75] Inventors: Tomio Mimura; Shigeru Shimojo, both of Osaka; Masaki Iijima, Tokyo; Shigeaki Mitsuoka, Hiroshima, all of Japan

[73] Assignees: The Kansai Electric Power Co., Inc., Osaki; Mitsubishi Jukogyo Kabushiki Kaisha, Tokyo, both of Japan

[21] Appl. No.: 742,747

[22] Filed: Nov. 1, 1996

Related U.S. Application Data

[62] Division of Ser. No. 405,628, Mar. 15, 1995, Pat. No. 5,609,840.

[30] Foreign Application Priority Data

| Mar. 18, 1994 | [JP] | Japan | 6-48704 |
| Mar. 18, 1994 | [JP] | Japan | 6-48705 |
| Mar. 18, 1994 | [JP] | Japan | 6-48706 |

[51] Int. Cl.$^6$ ............... C01B 17/16; B01D 53/50
[52] U.S. Cl. ............... 423/228; 423/220; 423/229; 423/242.2
[58] Field of Search ............... 423/228, 292.2, 423/220, 229

[56] References Cited

U.S. PATENT DOCUMENTS

| 3,856,921 | 12/1974 | Shrier et al. | 423/228 |
| 3,891,742 | 6/1975 | Yeakey et al. | 423/229 |
| 4,093,701 | 6/1978 | Butwell | 423/228 |
| 4,096,085 | 6/1978 | Holoman, Jr. et al. | 252/189 |
| 4,101,633 | 7/1978 | Sartori et al. | 423/228 |
| 4,539,189 | 9/1985 | Starkston et al. | 423/220 |
| 4,545,965 | 10/1985 | Gazzi et al. | 423/229 |
| 4,553,984 | 11/1985 | Volkamer et al. | 55/46 |
| 4,647,397 | 3/1987 | Starkston et al. | 252/189 |
| 4,844,876 | 7/1989 | Oliveau et al. | 423/220 |
| 5,029,914 | 7/1991 | Petavy et al. | 423/228 |
| 5,104,630 | 4/1992 | Holmes et al. | 423/242 |
| 5,314,672 | 5/1994 | Vasil | 423/228 |

FOREIGN PATENT DOCUMENTS

| 399 608 A | 11/1990 | European Pat. Off. |
| 2017524 | 10/1979 | United Kingdom |
| 2191419 | 6/1986 | United Kingdom |

OTHER PUBLICATIONS

Chemical Engineering Science, vol. 41, No. 2, pp. 405–408 (No date).
Energy Conservation Industrial, pp. 20–28, 1984.
Energy Conservation Industry Appl. Techniques, pp. 253–262, 1983.
Oil & Gas Journal, pp. 70–76, 1984.
Oil & Gas Journal, vol. 84, No. 39, pp. 61–65, 1986.
Chemical Abstracts Online, Registry File, printout, pp. 1–2.

*Primary Examiner*—Deborah Jones
*Attorney, Agent, or Firm*—Jacobson, Price, Holman & Stern, PLLC

[57] ABSTRACT

This invention relates to methods for the removal of hydrogen sulfide from various gases containing hydrogen sulfide. In order to remove hydrogen sulfide, an aqueous solution containing a di(lower alkyl)amino-(lower alkanol) or triethylenediamine is used. In order to remove hydrogen sulfide selectively from gases containing carbon dioxide and hydrogen sulfide, an aqueous solution containing tert-butyldiethanolamine, triisopropanolamine, triethylenediamine or 2-dimethylamino-2-methyl-1-propanol is used. In order to remove both carbon dioxide and hydrogen sulfide from gases containing carbon dioxide and hydrogen sulfide, an aqueous solution containing a mono(lower alkyl)amino-(lower alkanol) is used.

5 Claims, 9 Drawing Sheets

5,750,083

METHOD FOR THE REMOVAL OF HYDROGEN SULFIDE PRESENT IN GASES

This is a divisional of application Ser. No. 08/405,628 filed Mar. 15, 1995 now U.S. Pat. No. 5,609,840 issued Mar. 11, 1997.

FIELD OF THE INVENTION AND RELATED ART STATEMENT

This invention relates to a method for the removal of $H_2S$ (hydrogen sulfide) from various gases containing $H_2S$.

Moreover, this invention relates to a method for the selective removal of $H_2S$ from various gases containing $CO_2$ (carbon dioxide) and $H_2S$. More particularly, it relates to a method for the selective removal of $H_2S$ from such a gas by bringing the gas into contact with an aqueous solution of a specific hindered amine.

Furthermore, this invention relates to a method for the removal of both $CO_2$ and $H_2S$ from various gases containing $CO_2$ and $H_2S$.

Conventionally, techniques for removing acid gases such as $CO_2$ and $H_2S$ from various gases (e.g., gases obtained by the gasification of coal or heavy oil, synthesis gas, water gas and natural gas) by use of an absorbent have been known. These techniques vary widely and include processes using a single absorbent, a mixed absorbent, a nonaqueous absorbing solution and an aqueous absorbing solution. Moreover, a suitable absorbent is selected according to the intended purpose of the process, for example, according to whether the process is intended to remove $H_2S$ selectively from a gas containing $CO_2$ and $H_2S$, or to remove both $CO_2$ and $H_2S$ from a gas containing them. For example, monoethanolamine (hereinafter abbreviated as "MEA") is known to be an effective absorbent for the removal of both $CO_2$ and $H_2S$ from a gas containing them.

U.S. Pat. No. 4,553,984 discloses a process for the removal of $CO_2$ and $H_2S$ from a raw gas containing them wherein the raw gas is brought into counterflow contact with a 20–70 Wt. % aqueous solution of methyldiethanolamine (hereinafter abbreviated as "MDEA") at a pressure of 10–110 bars and a temperature of 40°–100° C.

The rates of $CO_2$ and $H_2S$ absorption by an aqueous solution of a hindered amine such as 2-amino-2-methyl-1-propanol (hereinafter abbreviated as "AMP") and an aqueous solution of a straight-chain amine such as monoethanolamine (hereinafter abbreviated as "MEA") in the vicinity of ordinary temperature are reported in Chemical Engineering Science, Vol.41, No.2, pp.405–408.

A process for the selective removal of $H_2S$ from gaseous mixtures containing $CO_2$ is discussed in Energy Conservation Industrial, pp.20–28, 1984. It is stated therein that a solution of dimethylethanolamine or MDEA in N-methylpyrrolidone containing several percent of water is promising.

A method for the separation of $H_2S$ and $CO_2$ by utilizing their different reactivity with a tertiary amine in an anhydrous solvent is proposed in Energy Conserv. Industry Appl. Techniques, pp.253–262, 1983. The amines used for this purpose include MDEA, dimethylethanolamine (also known as 2-dimethylaminoethanol), diethylethanolamine (also known as 2-diethylaminoethanol), 1-dimethylaminopropan-2-ol and the like.

It is described in Oil & Gas Journal, July 16th, pp.70–76 (1984) that Flexsorb SE (trade name) is an absorbent suitable for the selective removal of $H_2S$. Flexsorb PS (trade name) is an absorbent suitable for the removal of both $CO_2$ and $H_2S$, and Flexsorb HP (trade name) is an absorbent suitable for the removal of $CO_2$. Their $H_2S$-absorbing power is said to be 40% higher than that of an aqueous MDEA solution. However, the compositions of these absorbents are unknown and these absorbents are nonaqueous.

It is described in Oil & Gas Journal, vol. 84, No. 39, pp.61–65 (1986) that tertiary ethanolamines such as MDEA and triethanolamine (in particular, MDEA) are useful for the removal of $CO_2$ and $H_2S$. It is also described therein that MDEA is used as a selective absorbent for $H_2S$.

SUMMARY OF THE INVENTION

As described above, a number of techniques for the removal of $CO_2$ and $H_2S$ from gases containing them have been proposed. However, there is a field of application in which it is required to reduce the $H_2S$ content in the object gas to a very low level or remove $H_2S$ therefrom almost completely without great or essential need of removing $CO_2$ therefrom. For this purpose, an absorbent having high absorption selectivity for $H_2S$ and high $H_2S$-absorbing power is desired. Although absorbents for the removal of $H_2S$ have been proposed in the above-described prior art, an absorbent is still being sought which is used in the form of an aqueous solution convenient for use in processes, shows an improvement in $H_2S$-absorbing power, and can absorb $H_2S$ almost completely from the object gas according to the above-described purpose.

In view of the above-described problem, the present inventors made investigations in the search for an absorbent which can absorb $H_2S$ from $H_2S$-containing object gases with relatively high selectivity and also has high $H_2S$-absorbing power. As a result, it has been discovered that specific hindered amines are particularly effective and, moreover, $H_2S$ can be almost completely removed from the object gas by using such an absorbent and choosing suitable treating conditions. The present invention has been completed on the basis of this discovery.

Thus, according to a first aspect of the present invention, there is provided a method for the removal of $H_2S$ from a gas containing $H_2S$ which comprises bringing the gas into contact with an excess of an aqueous solution of a hindered amine selected from the group consisting of di(lower alkyl) amino-(lower alkanol) and triethylenediamine, until the $H_2S$ concentration in the treated gas is reduced to 10 ppm or less and preferably to substantially less than its detection limit. As used herein, the expression "an excess of an aqueous solution of a hindered amine" means a large amount of an aqueous solution of a hindered amine which, when used for the treatment of an object gas, can reduce the $H_2S$ concentration in the treated gas to an undetectable level.

According to method of the first aspect of the present invention, a marked improvement in $H_2S$-absorbing power can be achieved over conventional processes using MDEA. Moreover, by utilizing this property, the $H_2S$ content in gases containing it (e.g., gases containing both $H_2S$ and $CO_2$) can be reduced significantly. For example, when fuel gas for use in electric power generation is thus reduced in $H_2S$ content, combustion exhaust gas produced therefrom practically eliminates the necessity for a flue gas desulfurization system and, moreover, such fuel gas can be utilized as a perfect no-pollution fuel from the viewpoint of $So_x$ emission. Furthermore, when this method is applied to raw gas for the manufacture of domestic fuel, the content of highly toxic $H_2S$ can be significantly reduced or completely removed, contributing greatly to an enhancement in safety during delivery and use of the gas.

Moreover, there is a field of application in which it is required to remove $H_2S$ from the object gas as selectively as possible without need of removing $CO_2$ therefrom. For this purpose, an absorbent having higher absorption selectivity for $H_2S$ and requiring less energy for the regeneration of the absorbent is desired. In such an application, an absorbent which absorbs $CO_2$ effectively in addition to $H_2S$ is undesirable because more energy is required in the step of regenerating and recovering the absorbent. Although absorbents for the selective removal of $H_2S$ have been proposed in the above-described prior art, an absorbent is still being sought which is used in the form of an aqueous solution convenient for use in processes, can absorb $H_2S$ more selectively, and has high $H_2S$-absorbing power.

In view of the above-described problem, the present inventors made intensive investigations in the search for an absorbent which can absorb $H_2S$ selectively from object gases containing $CO_2$ and $H_2S$. As a result, it has been discovered aqueous solutions of specific hindered amines are particularly effective. The present invention has been completed on the basis of this discovery.

Thus, according to a second aspect of the present invention, there is provided a method for the selective removal of $H_2S$ from a gas containing $CO_2$ and $H_2S$ which comprises bringing the gas into contact with an aqueous solution of a hindered amine selected from the group consisting of tert-butyldiethanolamine, triisopropanolamine, triethylenediamine and 2-dimethylamino-2-methyl-1-propanol.

According to the method of the second aspect of the present invention, $H_2S$ can be more selectively removed from raw gases containing $H_2S$ and $CO_2$, as compared with conventional processes using MDEA as absorbent.

Furthermore, there is a field of application in which it is required to remove both $H_2S$ and $CO_2$ more efficiently from the object gas. For this purpose, an absorbent is being sought which has relatively high $H_2S$-absorbing power and also high $CO_2$-absorbing power and is of the aqueous type for ease of handling.

In view of the above-described problem, the present inventors made investigations in the search for an absorbent having high power to absorb both $H_2S$ and $CO_2$ from object gases containing them. As a result, it has been discovered that specific hindered amines are particularly effective.

Thus, according to a third aspect of the present invention, there is provided a method for the removal of $CO_2$ and $H_2S$ from a gas containing $CO_2$ and $H_2S$ which comprises bringing the gas into contact with an aqueous solution of a hindered amine selected from mono(lower alkyl) aminomono-(lower alkanol).

According to the method of the third aspect of the present invention, an improvement in absorbing power for both $H_2S$ and $CO_2$ can be achieved over conventional processes using MEA. Thus, the method of the third aspect of the present invention makes it possible to reduce the $H_2S$ and $CO_2$ contents in a given object gas containing them simultaneously and markedly. More specifically, the concentrations of both components in the treated gas can be reduced, for example, to 10 ppm or less and preferably to a completely removed level of 1 ppm or less, by choosing the absorbing conditions properly.

DETAILED DESCRIPTION OF PREFERRED EMBODIMENTS

Figure 1:
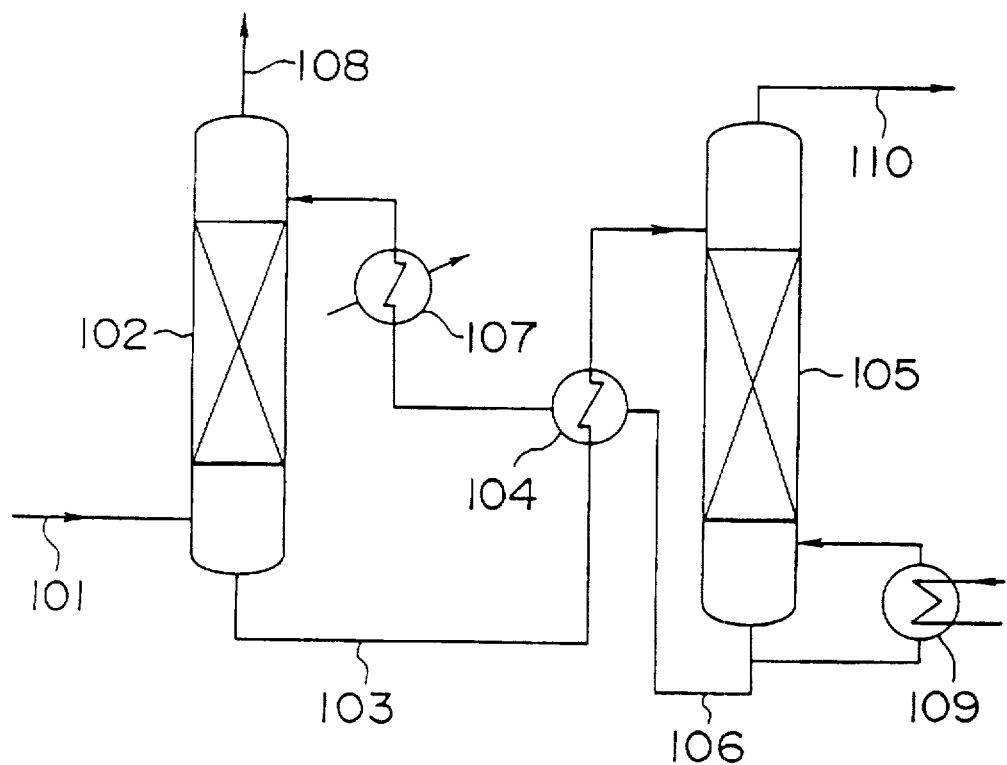
FIG. 1 is a flow diagram illustrating an exemplary process which can be employed in the present invention.

The hindered amine used as absorbent in the first aspect of the present invention is selected from the group consisting of di(lower alkyl)amino-(lower alkanol) and triethylenediamine (TEDA). The lower alkyl groups constituting the former are straight-chain or branched alkyl groups having 4 or less carbon atoms, and examples thereof include methyl, ethyl, propyl and butyl groups. The two alkyl groups may be the same or different. The lower alkanol constituting di(lower alkyl)amino-(lower alkanol) is an alkanol having 6 or less carbon atoms and can be, for example, a straight-chain or branched alkanol such as ethanol, propanol (which may be branched), butanol (which may be branched), pentanol (which may be branched) or hexanol (which may be branched). Specific examples of such di(lower alkyl)amino-(lower alkanols) include 2-dimethylaminoethanol, 2-diethylaminoethanol (DEAE), 2-dimethylamino-2-methyl-1-propanol (DMAMP), 2-dimethylamino-2-methylethanol, 3-dimethylamino-1-propanol (DMAP), 3-dimethylamino-3-methyl-1-propanol, 3-dimethylamino-3, 3-dimethyl-1-propanol, 3-dimethylamino-2-methyl-1-propanol, 3-dimethylamino-2,2-dimethyl-1-propanol and 4-dimethylamino-1-butanol (DMAB). These compounds may be used alone or in admixture of two or more.

The absorbent solution used in the first aspect of the present invention is an aqueous solution of the above-described hindered amine, and its hindered amine concentration is usually in the range of 15 to 75% by weight. If necessary, the aqueous solution used in the first aspect of the present invention may further contain corrosion inhibitors, deterioration inhibitors and other additives. In the first aspect of the present invention, the temperature at which the object gas is brought into contact with the aqueous hindered amine solution is usually in the range of 30° to 70° C. The pressure of the object gas at the time of contact usually ranges from atmospheric pressure to 150 kg/cm$^2$G, though it depends on the type of the object gas.

In the treatment of a gas containing both $CO_2$ and $H_2S$, the aqueous hindered amine solution used in the first aspect of the present invention exhibits selective absorption properties for $H_2S$. This does not necessarily mean that $CO_2$ is not absorbed at all, but that the absorption rate for $CO_2$ is relatively low as compared with that for $H_2S$. However, the absorption rates vary according to the composition of the object gas, the absorbing conditions, and the like. In the present invention, therefore, it has been decided to evaluate its selectivity by selective absorption capacity. As used herein, the term "selective absorption capacity" refers to a value obtained by dividing the number of moles of $H_2S$ absorbed into the absorbing solution under absorbing conditions by the number of moles of $CO_2$, and further dividing the quotient by the molar ratio of $H_2S$ to $CO_2$ present in the object gas. The aqueous hindered amine solution used in the first aspect of the present invention exhibits an equal or somewhat lower selective absorption capacity, as compared with an aqueous MDEA solution which has conventionally been used. However, the aqueous hindered amine solution used in the first aspect of the present invention exhibits significantly higher $H_2S$-absorbing power as compared with an aqueous MDEA solution. Thus, according to the method of the first aspect of the present invention in which a gas containing $H_2S$ is treated with an excess of the above-described aqueous hindered amine solution, the $H_2S$ content in the treated gas can be reduced to 10 ppm or less and preferably to substantially less than its detection limit.

The method for the removal of $H_2S$ in accordance with the first aspect of the present invention can be applied to a variety of object gases. Such object gases include, for example, gases obtained by the gasification of coal or heavy oil, synthesis gas, water gas, natural gas and refined petroleum gas. Especially in the case of gas for use in electric power generation, if its $H_2S$ content can be reduced, for example, to 5 ppm or less, the resulting combustion exhaust gas will have an $SO_x$ concentration of 1 ppm or less. This means that almost perfect desulfurization can be achieved in substance. In the case of gas for domestic use, it is necessary from the viewpoint of safety to reduce its $H_2S$ content to 10 ppm or less and preferably to substantially less than its detection limit. Thus, the $H_2S$ contents of object gases used for certain purposes need to be reduced significantly. In such object gases, $CO_2$ is usually contained in a larger amount than $H_2S$. According to the first aspect of the present invention, such an object gas is treated with an excess of an aqueous solution of a hindered amine comprising a di(lower alkyl)amino-(lower alkanol) or triethylenediamine. Although the aqueous solution absorbs some $CO_2$, it absorbs $H_2S$ with relatively high selectivity, so that the $H_2S$ content in the treated gas is markedly reduced. No particular limitation is placed on such object gases, and the $H_2S$ content in the treated gas can be reduced to 10 ppm or less and preferably to substantially less than its detection limit, by choosing the absorbing conditions properly according to the composition of the object gas. Thus, the above-described need for a reduction in $H_2S$ content can be met.

The hindered amine used as absorbent in the second aspect of the present invention is selected from the group consisting of tert-butyldiethanolamine [t-BuN($CH_2CH_2OH$)$_2$; hereinafter abbreviated as "BDEA"), triisopropanolamine {[$CH_3CH(OH)CH_2$]$_3$N; hereinafter abbreviated as "TIPA"}, triethylenediamine [N($CH_2$)$_6$N; hereinafter abbreviated as "TEDA"] and 2-dimethylamino-2-methyl-1-propanol [($CH_3$)$_2$NC($CH_3$)$_2$CH$_2$OH; hereinafter abbreviated as "DMAMP"]. These compounds may be used alone or in admixture of two or more. Among these compounds, TIPA, TEDA and BDEA are preferred from the viewpoint of selective absorption capacity for $H_2S$, and DMAMP and TEDA are preferred from the viewpoint of $H_2S$-absorbing power.

The absorbent solution used in the second aspect of the present invention is an aqueous solution of the above-described hindered amine, and its hindered amine concentration is usually in the range of 15 to 75% by weight. If necessary, the aqueous solution used in the second aspect of the present invention may further contain corrosion inhibitors, deterioration inhibitors and other additives. In the first of the present invention, the temperature at which the object gas is brought into contact with the aqueous solution is usually in the range of 30° to 70° C. The pressure of the object gas at the time of contact usually ranges from atmospheric pressure to 150 kg/cm$^2$G, though it depends on the type of the object gas.

The method for the selective removal of $H_2S$ in accordance with the second aspect of the present invention can be applied to a variety of object gases. Such object gases include, for example, gases obtained by the gasification of coal or heavy oil, synthesis gas, water gas, natural gas and refined petroleum gas. Moreover, this method can also be applied to the removal of $H_2S$ contained in Claus tail gas resulting from petroleum refining.

The hindered amine used as absorbent in the third aspect of the present invention is selected from the group consisting of mono(lower alkyl)aminomono-(lower alkanol). In these compounds, the lower alkyl group constituting the (lower alkyl)amino group is a straight-chain or branched alkyl group having 4 or less carbon atoms, and examples thereof include methyl, ethyl, propyl and butyl groups. The lower alkanol constituting mono(lower alkyl)aminomono-(lower alkanol) is an alkanol having 4 or less carbon atoms and can be, for example, methanol, ethanol, 1-propanol, 2-propanol (isopropyl alcohol), n-butyl alcohol, i-butyl alcohol, s-butyl alcohol and t-butyl alcohol. Specific examples of such mono(lower alkyl)aminomono-(lower alkanol) include 2-methylaminoethanol, 2-ethylaminoethanol (EAE), 2-propylaminoethanol, 3-methylamino-1-propanol, 3-ethylamino-1-propanol, 3-propylamino-1-propanol, 2-methylamino-1-methylethanol, 2-ethylamino-1-methylethanol, 2-propylamino-1-methylethanol, 4-methylamino-1-butanol and 4-ethylamino-1-butanol. These compounds may be used alone or in admixture of two or more.

The absorbent solution used in the third aspect of the present invention is an aqueous solution of the above-described hindered amine, and its hindered amine concentration is usually in the range of 15 to 75% by weight. If necessary, the aqueous solution used in the third aspect of the present invention may further contain corrosion inhibitors, deterioration inhibitors and other additives. In the third aspect of the present invention, the temperature at which the object gas is brought into contact with the aqueous hindered amine solution is usually in the range of 30° to 70° C. The pressure of the object gas at the time of contact usually ranges from atmospheric pressure to 150 kg/cm$^2$G, though it depends on the type of the object gas.

The aqueous hindered amine solution used in the third aspect of the present invention exhibits high absorbing power for both $H_2S$ and $CO_2$. However, the absorption rates for these component gases vary according to the composition of the object gas, the absorbing conditions, and the like. In the present invention, therefore, it has been decided to evaluate the aqueous hindered amine solution by selective absorption capacity for $H_2S$. When compared with an aqueous MEA solution which has conventionally been used for this purpose, the aqueous hindered amine solution used in the third aspect of the present invention is characterized in that it has an almost equal selective absorption capacity for $H_2S$ and absorbs $CO_2$ similarly, and in that it has higher $H_2S$-absorbing power than an aqueous MEA solution.

The method for the removal of $H_2S$ and $CO_2$ from a gas in accordance with the third aspect of the present invention can be applied to a variety of object gases. Such object gases include, for example, gases obtained by the gasification of coal or heavy oil, synthesis gas, water gas, natural gas and refined petroleum gas. Especially in the case of natural gas, $H_2S$ must naturally be removed therefrom. However, if $CO_2$ is contained therein besides $H_2S$, $CO_2$ freezes when natural gas is cooled to −50° C. or less in the step of liquefying methane and ethane present therein, resulting in a clogging of the lines of the liquefaction step. Accordingly, in addition to the desulfurization of natural gas, its $CO_2$ content needs to be reduced in a purification step prior to liquefaction. If the method for the removal of $H_2S$ and $CO_2$ from a gas in accordance with the third aspect of the present invention is applied to natural gas, both $CO_2$ and $H_2S$ can be reduced at the same time. Of course, not only in natural gas but also in other gases, a simultaneous reduction in the contents of $H_2S$ and undesired $CO_2$ is very useful because it permits a cutdown of shipping cost, the prevention of inactivation of the catalyst in synthetic reactions using the treated gas, and an increase in calorific value per unit quantity of fuel (in the case of fuels).

In the object gases to which the method of the third aspect of the present invention can be applied, $CO_2$ is usually contained in a larger amount than $H_2S$. Such object gases preferably contains $CO_2$ in a molar amount equal to not less than 25 times, more preferably not less than 50 times, that of $H_2S$. Even in the case of such object gases, the $H_2S$ and $CO_2$ contents in the treated gas can both be reduced to 10 ppm or less and preferably to 1 ppm or less, by choosing the absorbing conditions properly. Thus, the above-described need for a reduction in the contents of both components can be met.

Although no particular limitation is placed on the process employed in the methods of the present invention, an example thereof is described with reference to FIG. 1. In FIG. 1, only major equipment is illustrated and incidental equipment is omitted.

In FIG. 1, an object gas to be treated is introduced into the lower part of an absorption tower 102 through a feed line 101. In its packed region, the object gas is brought into gas-liquid contact with an absorbing solution which flows downward from above, and the treated gas is discharged from the system through a treated gas discharge line 108. The $H_2S$- and $CO_2$-loaded absorbing solution is withdrawn from the bottom of the absorption tower through an absorbing solution withdrawal line 103, heated by a heat exchanger 104, and introduced into a regeneration tower 105 for regenerating the absorbing solution. In the course leading to regeneration tower 105, part of the $H_2S$ may be separated by means of a flash drum. In regeneration tower 105, the absorbing solution is regenerated through heating by a reboiler 109 installed in the lower part thereof. The regenerated absorbing solution is withdrawn through a circulation line 106 and recycled to absorption tower 102 by way of heat exchangers 104 and 107. On the other hand, the $H_2S$- and $CO_2$-containing gas obtained by regeneration of the absorbing gas is withdrawn through a withdrawal line 110 and conducted to a subsequent treating process.

EXAMPLES

The present invention is further illustrated by the following examples.

Figure 2:
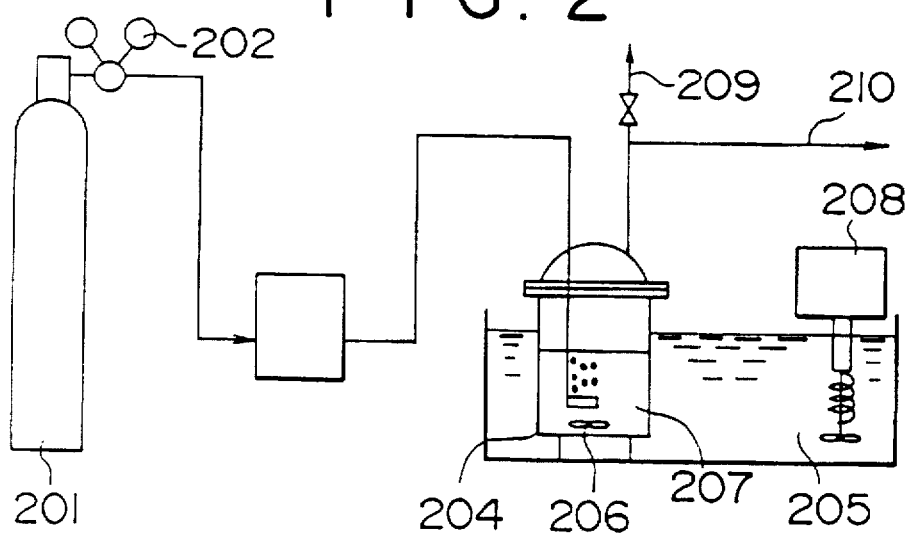
FIG. 2 is a schematic view illustrating a testing apparatus used in the examples of the present invention.

The testing apparatus used in the examples is illustrated in FIG. 2. In FIG. 2, a mixed gas consisting of $H_2S$, $CO_2$ and $N_2$ in a volume ratio of 1:50:49 is supplied from a cylinder 201 through a reducing valve 202 and a flow controller 203 to a 500 cc separable flask 204. This testing apparatus is arranged so that 300 g of an absorbing solution (having a total absorbent content of 1.01 moles) 207 is placed in separable flask 204 and the above-described mixed gas is bubbled thereinto with stirring by a stirrer 206. The temperature of absorbing solution 207 within separable flask 204 is maintained at 50° C. by means of a water bath 205 equipped with a temperature controller 208. Part of the outlet gas from which some gas components have been absorbed into the absorbing solution as a result of the bubbling is conducted to a sampling section 209 for analysis by gas chromatography, and the remainder is discharged from the system through a discharge section 210.

The mixed gas was introduced into an absorbing solution at a flow rate of 1 $Nm^3$/min. Under constant stirring conditions, the amount of $H_2S$ absorbed from the beginning of the absorption till the point at which the $H_2S$ concentration in the outlet gas reached the same level as in the supplied mixed gas (i.e., the $H_2S$ breakthrough point), and the selective absorption capacity for $H_2S$ were determined. The selective absorption capacity was a value obtained by dividing the molar ratio of $H_2S$ and $CO_2$ absorbed at the $H_2S$ breakthrough point by the ratio of $H_2S$ to $CO_2$ present in the starting gas (i.e., 1/50). The results obtained in Examples 1–5 carried out according to the method of the first aspect of the present invention are shown in Table 1.

TABLE 1

Figure 3:
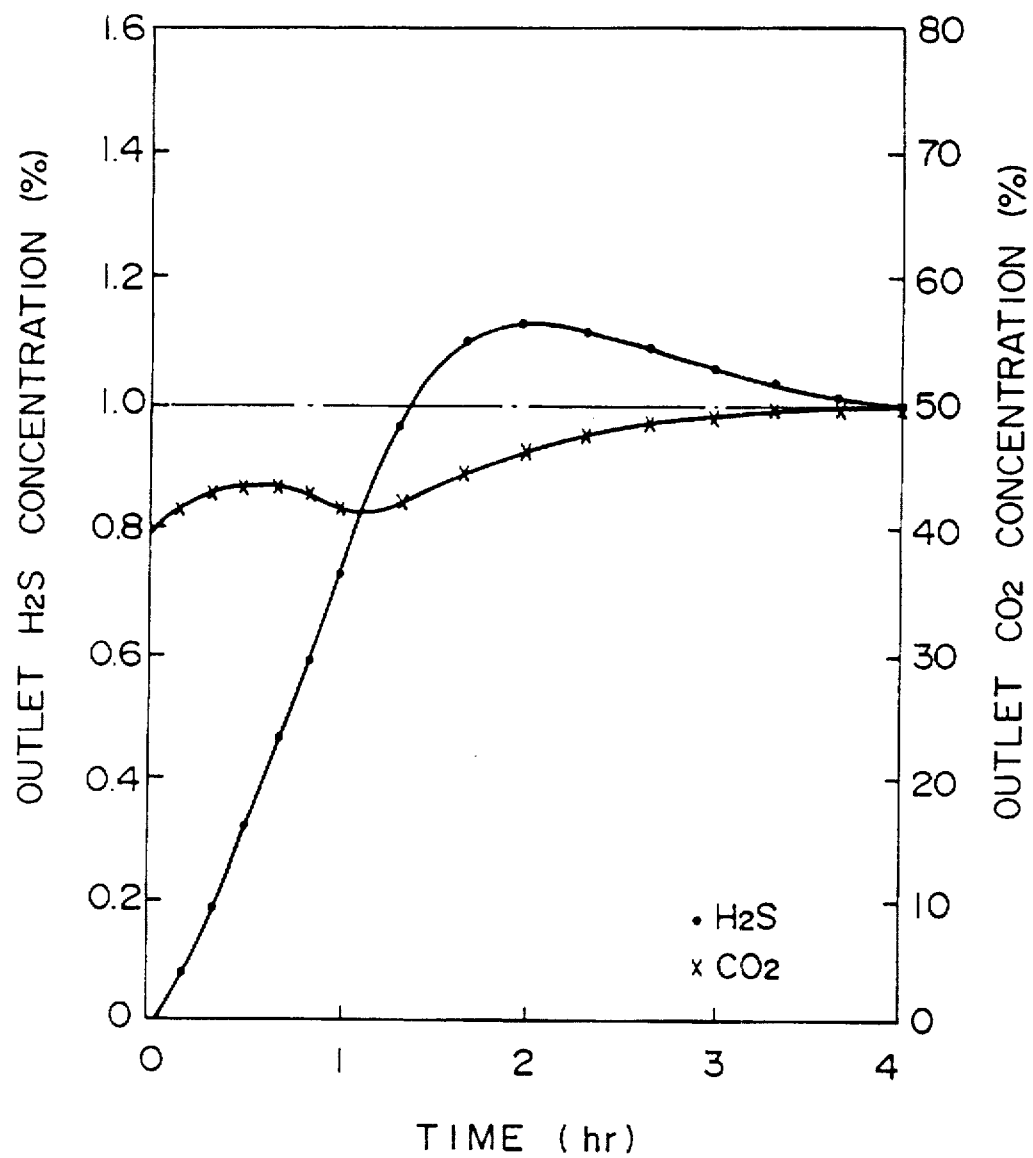
FIG. 3 is a graph showing the relationship between the time elapsed and the $H_2S$ and $CO_2$ concentrations in the outlet gas as recorded in Comparative Example 1 (MDEA)
Figure 4:
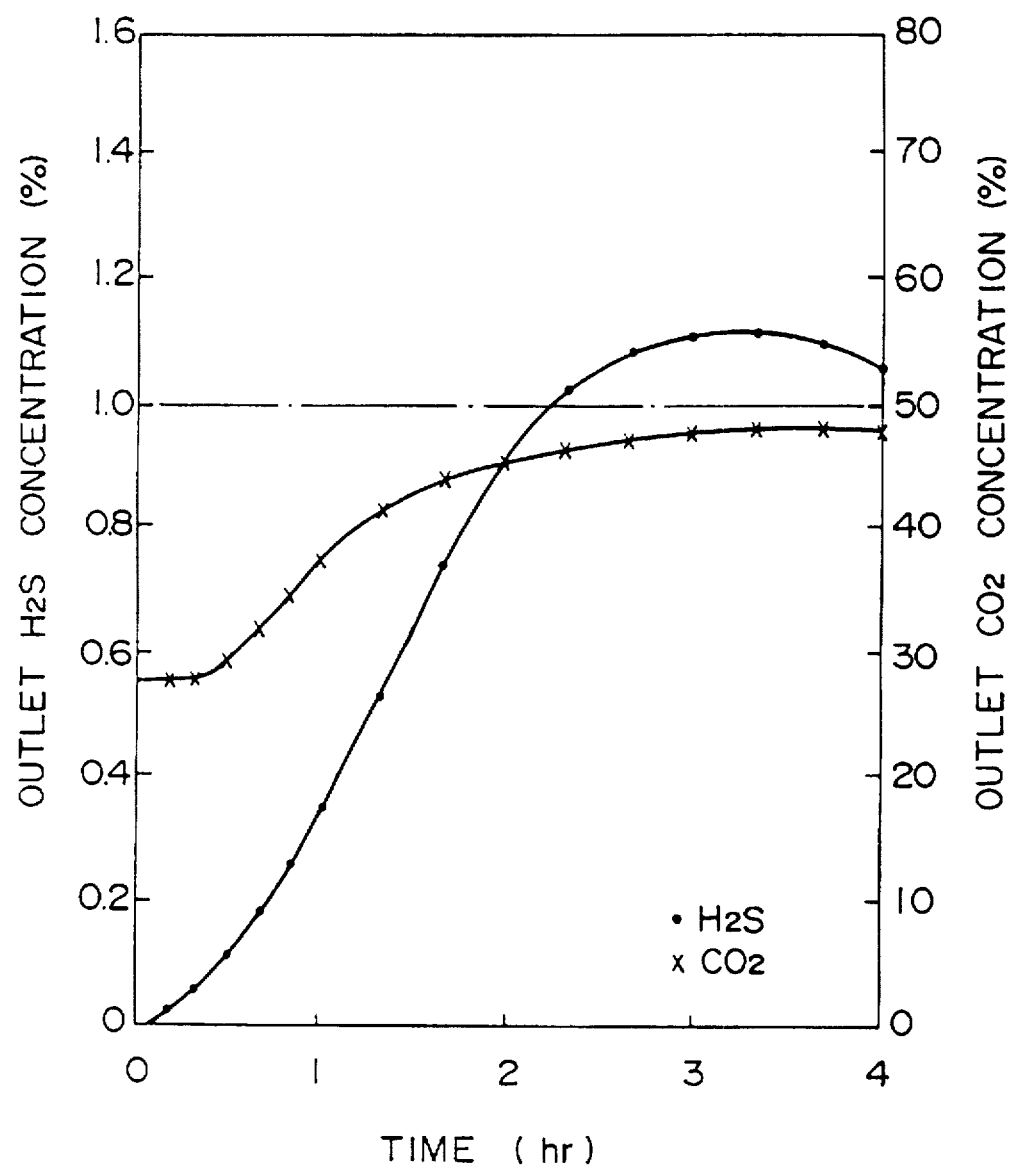
FIG. 4 is a graph showing the relationship between the time elapsed and the $H_2S$ and $CO_2$ concentrations in the outlet gas as recorded in Example 1 (DEAE) of the present invention.
Figure 5:
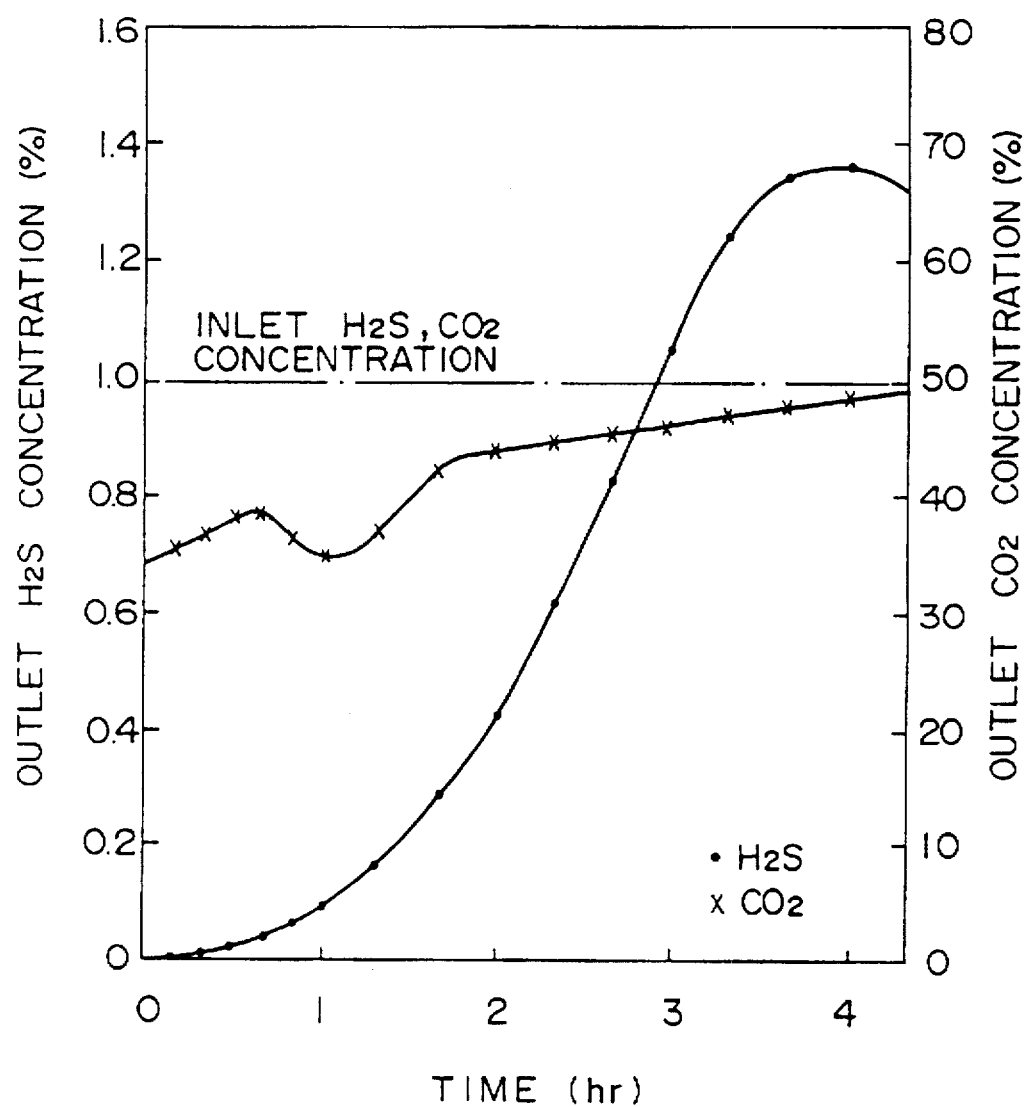
FIG. 5 is a graph showing the relationship between the time elapsed and the $H_2S$ and $CO_2$ concentrations in the outlet gas as recorded in Example 2 (DMAMP) of the present invention.
Figure 6:
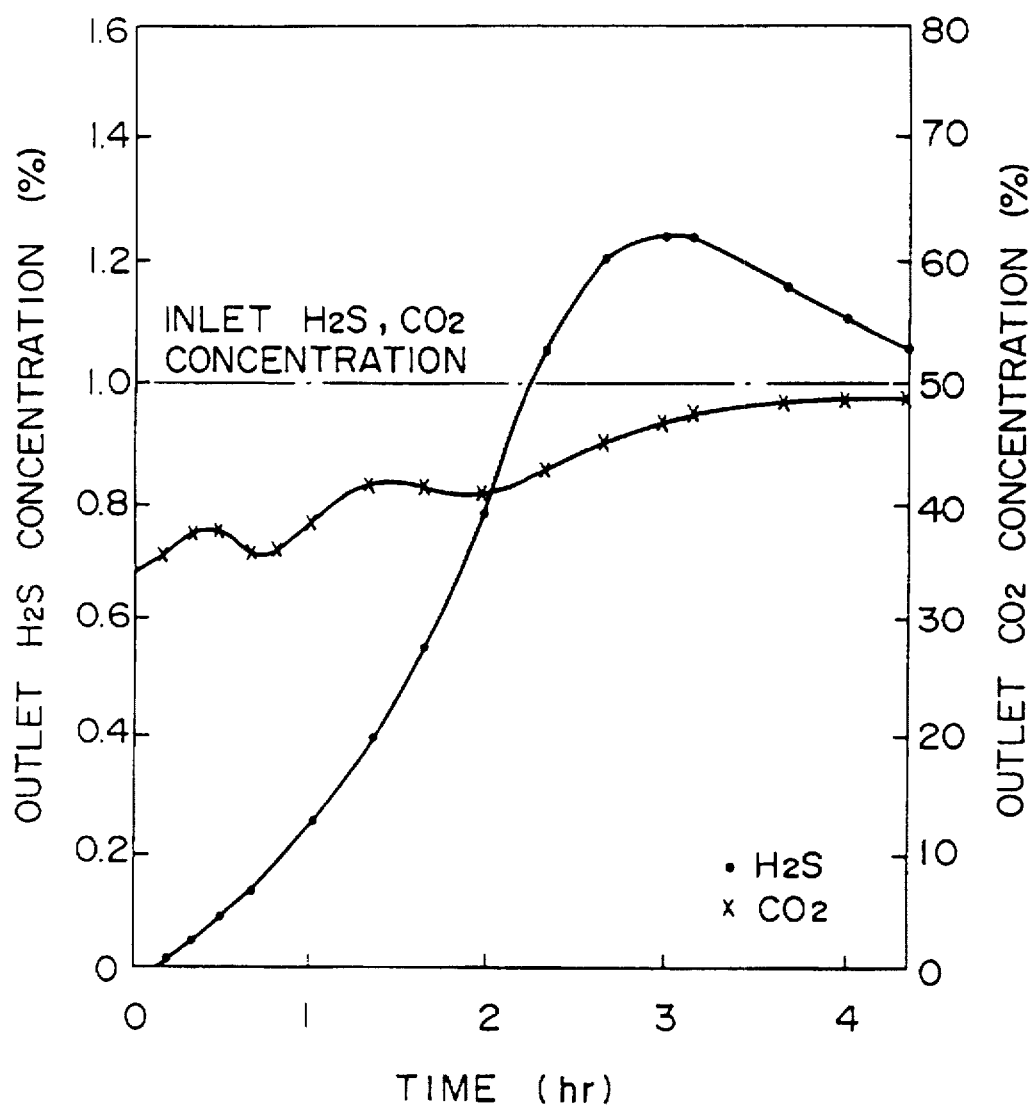
FIG. 6 is a graph showing the relationship between the time elapsed and the $H_2S$ and $CO_2$ concentrations in the outlet gas as recorded in Example 3 (DMAP) of the present invention.
Figure 7:
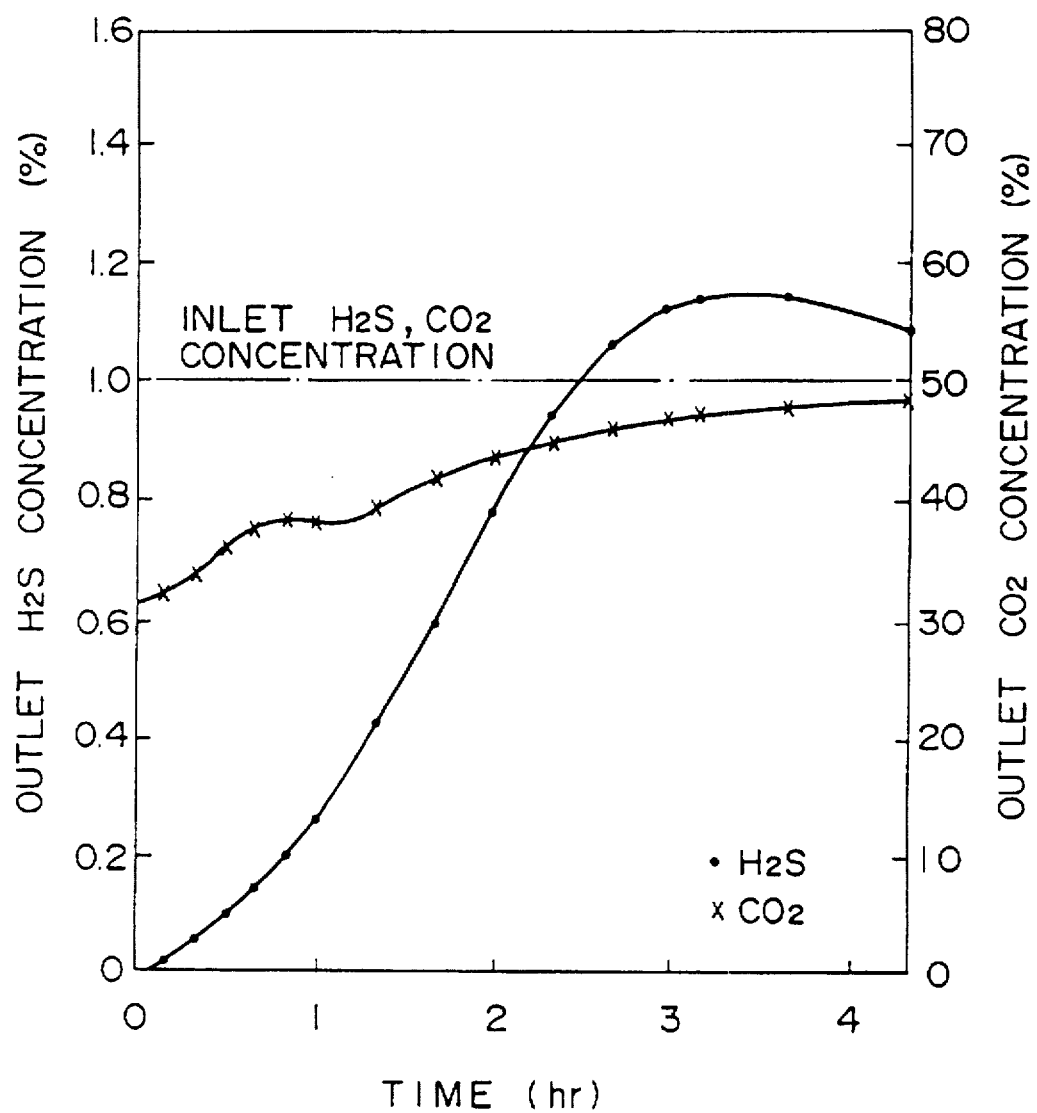
FIG. 7 is a graph showing the relationship between the time elapsed and the $H_2S$ and $CO_2$ concentrations in the outlet gas as recorded in Example 4 (DMAB) of the present invention.
Figure 8:
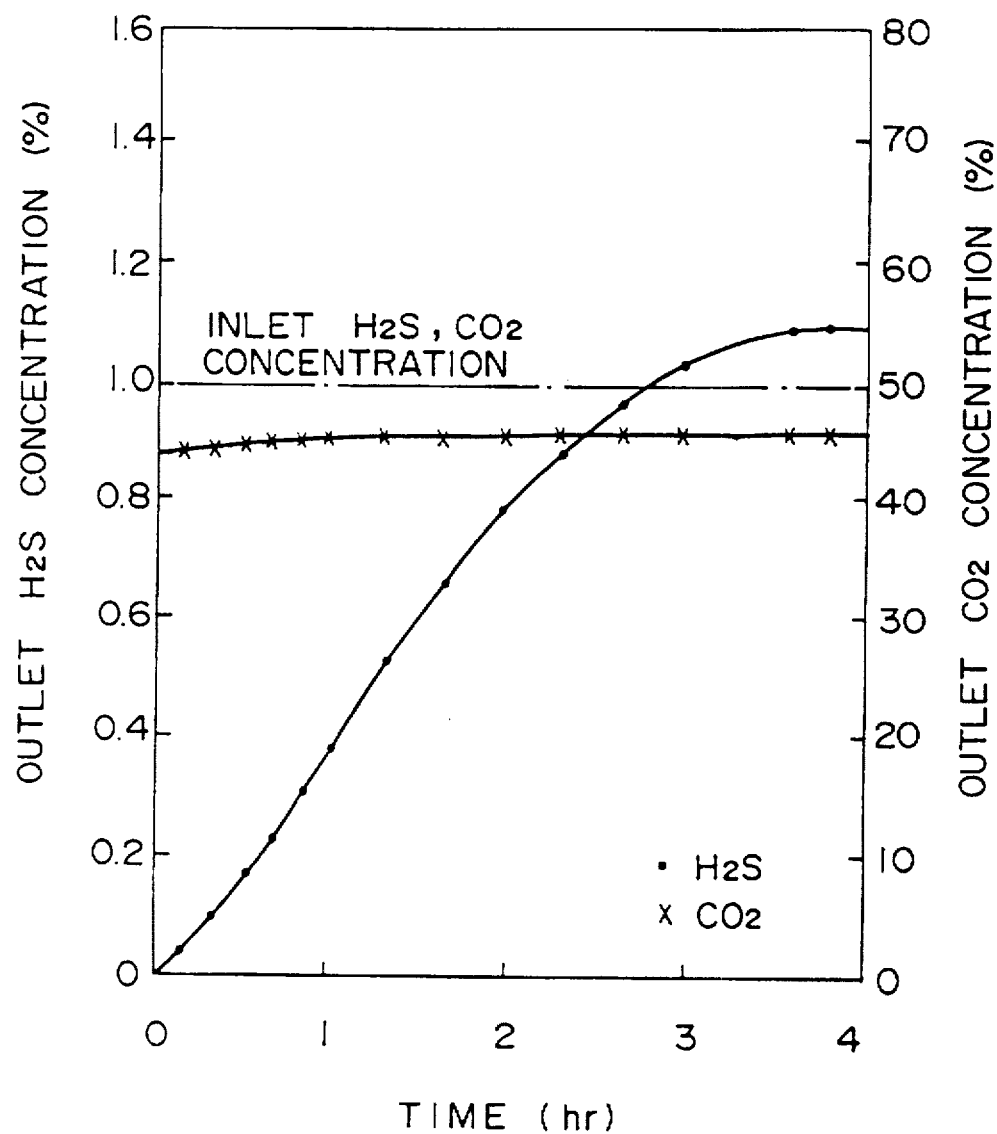
FIG. 8 is a graph showing the relationship between the time elapsed and the $H_2S$ and $CO_2$ concentrations in the outlet gas as recorded in Example 5 (TEDA) of the present invention.

| | | $H_2S$ breakthrough point | | |
|---|---|---|---|---|
| | Hindered amine (FIG. No.) | Amount of $H_2S$ absorbed (moles/mole of amine) | Amount of $CO_2$ absorbed (moles/mole of amine) | Selective absorption capacity |
| Comparative Example 1 | MDEA (FIG. 3) | 0.0184 | 0.271 | 3.40 |
| Example 1 | DEAE (FIG. 4) | 0.0323 | 0.731 | 2.20 |
| Example 2 | DMAMP (FIG. 5) | 0.0531 | 0.732 | 3.65 |
| Example 3 | DMAP (FIG. 6) | 0.0401 | 0.673 | 3.00 |
| Example 4 | DMAB (FIG. 7) | 0.0371 | 0.665 | 2.80 |
| Example 5 | TEDA (FIG. 8) | 0.0354 | 0.344 | 5.15 |

It can be seen from Table 1 that the hindered amines used in the first aspect of the present invention cause the amount of $H_2S$ absorbed per mole of the hindered amine to be significantly increased, as compared with MDEA which has conventionally been used as a selective $H_2S$ absorbent. However, the amount of $CO_2$ absorbed per mole of the hindered amine is likewise increased, so that the selective absorption capacities of the hindered amines, though relatively high, are equal to or somewhat lower than that of MDEA. Nevertheless, the amount of $H_2S$ absorbed is so large as to contribute greatly to a reduction in the $H_2S$ content of the object gas.

FIGS. 3–8 show the relationships between the outlet concentrations of $H_2S$ and $CO_2$ [which are synonymous with the $H_2S$ and $CO_2$ concentrations in the treated gas and are plotted as ordinate on the left and right scales (in vol. %), respectively.] and the time elapsed (expressed in hours and plotted as abscissa), as recorded in Examples 1–5 and Comparative Example 1. As is evident from these figures, the initial value of the outlet $H_2S$ concentration is zero or nearly zero, indicating that $H_2S$ can be completely removed (i.e., to substantially less than its detection limit) by bringing the mixed gas to be treated into contact with an excess of an aqueous solution of a hindered amine. Moreover, the outlet $H_2S$ concentration increases very slowly with the lapse of time, indicating that the high $H_2S$-absorbing power lasts long. In the case of MDEA, however, the initial value of the outlet $H_2S$ concentration is zero, but the following values thereof increase sharply.

Next, the results obtained in Examples 2 and 5–7 carried out according to the method of the second aspect of the present invention are shown in Table 2.

TABLE 2

| | | $H_2S$ breakthrough point | | |
|---|---|---|---|---|
| | Hindered amine | Amount of $H_2S$ absorbed (moles/mole of amine) | Amount of $CO_2$ absorbed (moles/mole of amine) | Selective absorption capacity |
| Comparative Example 1 | MDEA | 0.0184 | 0.271 | 3.40 |
| Example 2 | DMAMP | 0.0531 | 0.732 | 3.65 |
| Example 5 | TEDA | 0.0354 | 0.344 | 5.15 |
| Example 6 | BDEA | 0.0163 | 0.184 | 4.45 |
| Example 7 | TIPA | 0.0039 | 0.022 | 8.85 |

It can be seen from Table 2 that, excepting TEDA and DMAMP, the hindered amines used in the second aspect of the present invention are smaller in the amount of $H_2S$ absorbed, but far more excellent in selective absorption capacity, as compared with MDEA which has conventionally been used as a selective $H_2S$ absorbent. Moreover, it can be seen that TEDA and DMAMP are greater in both selective absorption capacity and the amount of $H_2S$ absorbed than MDEA.

Next, the results obtained in Example 8 carried out according to the method of the third aspect of the present invention are shown in Table 3

TABLE 3

| | | $H_2S$ breakthrough point | | |
|---|---|---|---|---|
| | Amine | Amount of $H_2S$ absorbed (moles/mole of amine) | Amount of $CO_2$ absorbed (moles/mole of amine) | Selective absorption capacity |
| Example 8 | EAE (FIG. 9) | 0.0147 | 0.725 | 1.00 |
| Comparative Example 2 | MEA (FIG. 10) | 0.0091 | 0.479 | 0.95 |

It can be seen from Table 3 that the hindered amine used in the third aspect of the present invention causes the amounts of $H_2S$ and $CO_2$ absorbed per mole of the hindered amine to be both increased, as compared with MEA which has conventionally been used as an absorbent for both $H_2S$ and $CO_2$. Moreover, its selective absorption capacity is 1, indicating that its property of absorbing both $H_2S$ and $CO_2$ is higher. Thus, the aqueous hindered amine solution used in the third aspect of the present invention has been found to exhibit high absorbing power for both $H_2S$ and $CO_2$. This is also evident from a comparison of FIGS. 9 and 10.

Figure 9:
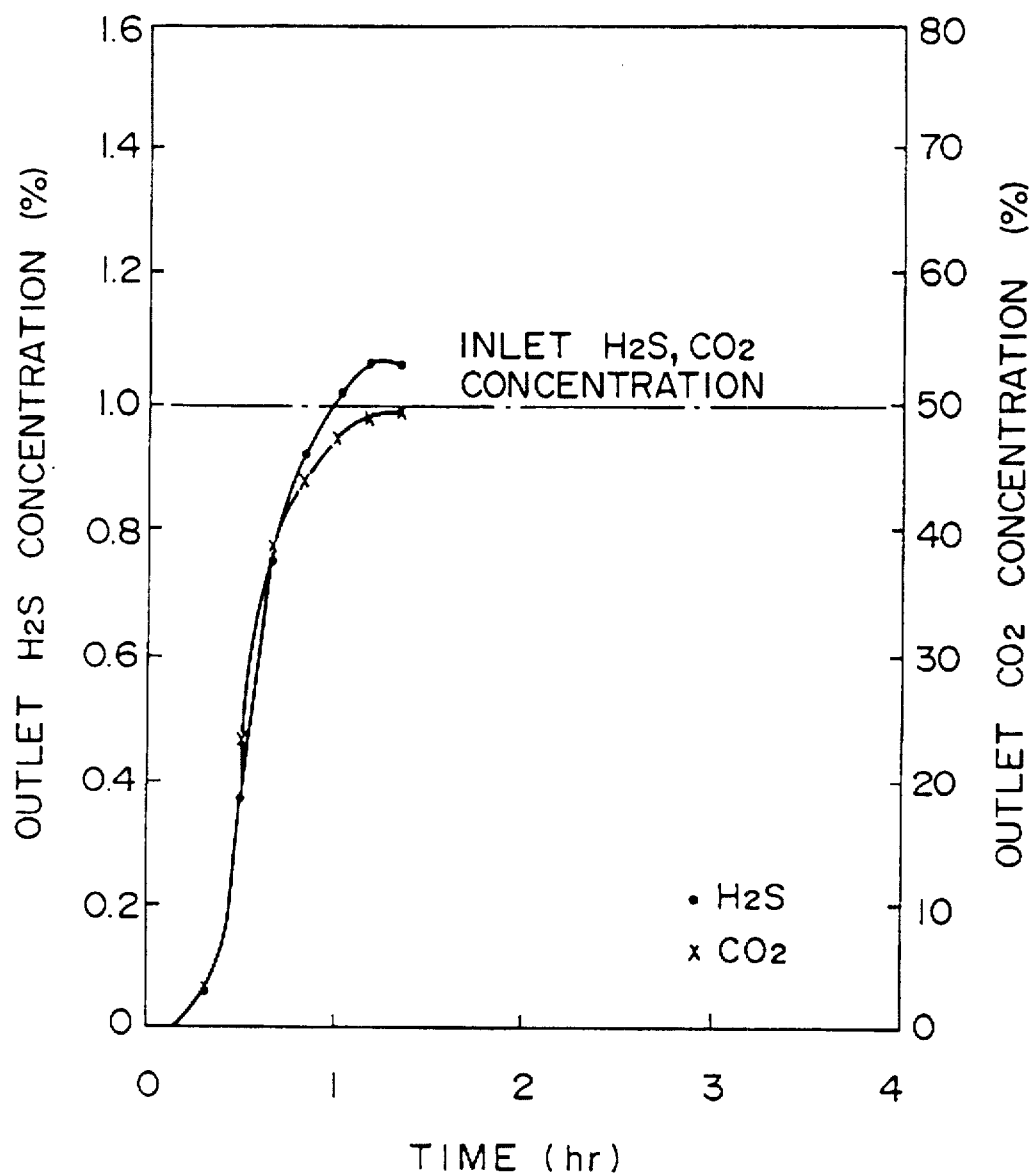
FIG. 9 is a graph showing the relationship between the time elapsed and the $H_2S$ and $CO_2$ concentrations in the outlet gas as recorded in Example 8 of the present invention.
Figure 10:
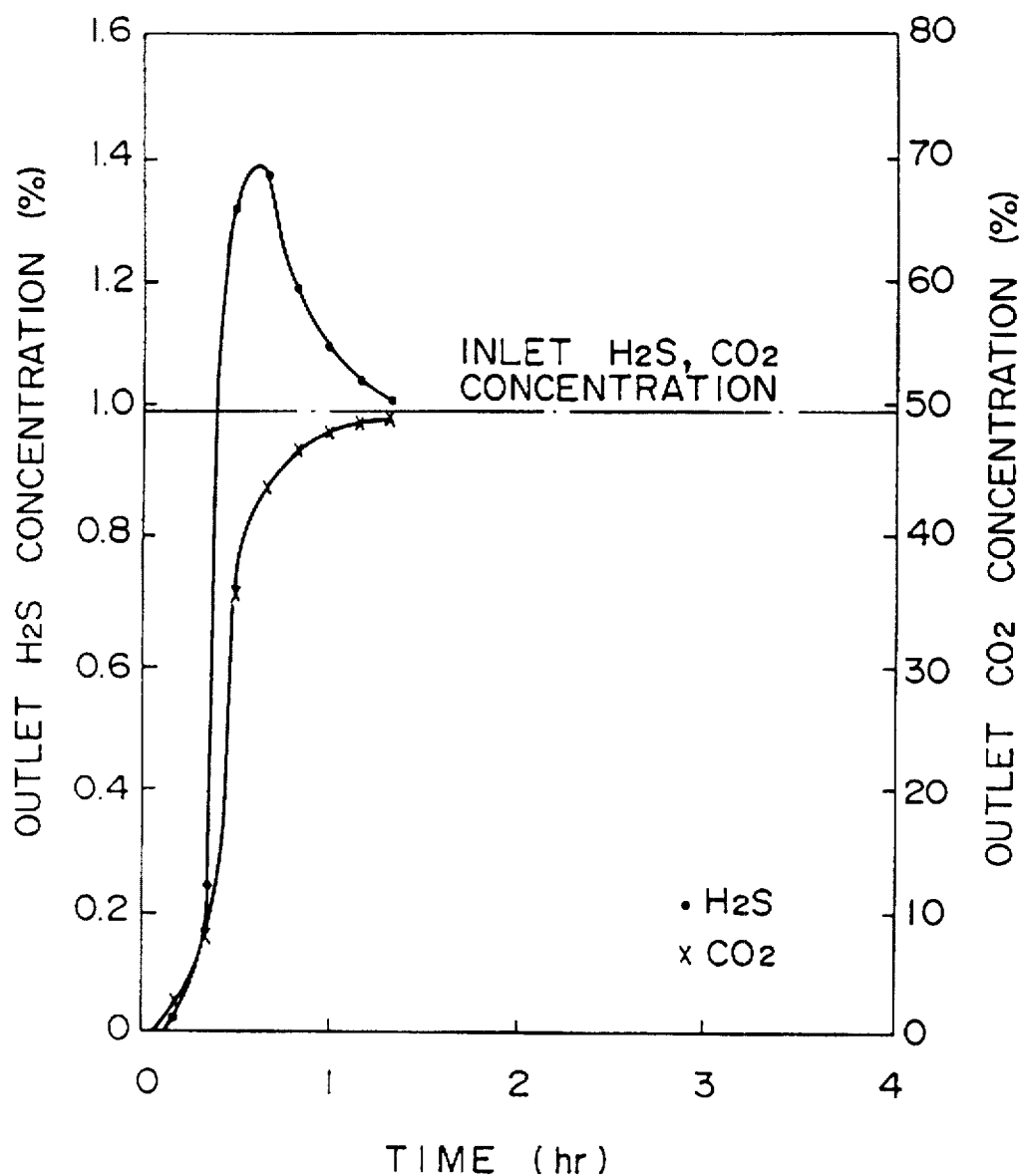
FIG. 10 is a graph showing the relationship between the time elapsed and the $H_2S$ and $CO_2$ concentrations in the outlet gas as recorded in Comparative Example 2.

FIGS. 9 and 10 correspond to Example 8 and Comparative Example 2, respectively, and show the relationships between the outlet concentrations of $H_2S$ and $CO_2$ [which are synonymous with the $H_2S$ and $CO_2$ concentrations in the treated gas and are plotted as ordinate on the left and right scales (in vol. %), respectively.] and the time elapsed (expressed in hours and plotted as abscissa). It is evident from these figures that, in Example 8 (FIG. 9), the initial $H_2S$ and $CO_2$ concentrations in the outlet gas are zero, indicating the complete removal of them. Accordingly, in a continuous absorption process as illustrated in FIG. 1, the $CO_2$ and $H_2S$ concentrations in the treated gas can be reduced to 10 ppm or less and preferably to 1 ppm or less, by choosing the absorbing conditions properly. It is evident from FIG. 9 that the outlet concentration of $H_2S$ rises in almost the same way as that of $CO_2$ when $H_2S$ and $CO_2$ are absorbed continuously. In contrast, when an aqueous MEA solution is used as absorbent (FIG. 10), the initial $CO_2$ and $H_2S$ concentrations in the outlet gas are zero, but the curves rise sharply. This indicates that its absorbing power for $CO_2$ and $H_2S$ is inferior to that of EAE.

We claim:

1. A method for the removal of the $H_2S$ from a gas containing less than 1 vol % of $H_2S$ which comprises bringing the gas into contact with an aqueous solution consisting essentially of triethylenediamine which, upon use, reduces the $H_2S$ concentration in the treated gas to 10 ppm or less.

2. A method for the removal of $H_2S$ from a gas containing less than 1 vol % of $H_2S$ which comprises bringing the gas into contact with an aqueous solution consisting essentially of triethylenediamine which, upon use, reduces the $H_2S$ concentration in the treated gas to 10 ppm or less.

3. A method for the selective removal of $H_2S$ from a gas containing $CO_2$ and $H_2S$ which comprises bringing the gas into contact with an aqueous solution consisting essentially of triethylenediamine.

4. A method for the removal of $CO_2$ and $H_2S$ from a gas containing $CO_2$ and $H_2S$ which comprises bringing the gas into contact with an aqueous solution consisting essentially of a secondary amine which has an alkyl group attached to a nitrogen atom, said alkyl group having 1 to 4 carbon atoms and which has an alkanol attached to the nitrogen atom, said alkanol having 1 to 4 carbon atoms.

5. A method according to claim 4 wherein the secondary amine is selected from the group consisting of 2-methylaminoethanol, 2-ethylaminoethanol, 2-propylaminoethanol, 3-methylamino-1-propanol, 3-ethylamino-1-propanol, 3-propylamino-1-propanol, 2-methylamino-1-methylethanol, 2-ethylamino-1-metylethanol, 2-propylamino-1-methylethanol, 4-memthylamino-1-butanol and 4-ethylamino-1-butanol.

* * * * *